United States Patent
Duron et al.

(10) Patent No.: US 9,454,778 B2
(45) Date of Patent: Sep. 27, 2016

(54) AUTOMATING CAPACITY UPGRADE ON DEMAND

(71) Applicant: GLOBALFOUNDRIES INC., Grand Cayman (KY)

(72) Inventors: Mike C. Duron, Pflugerville, TX (US); Mark D. McLaughlin, Austin, TX (US); Scott R. Smylie, Cedar Park, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 544 days.

(21) Appl. No.: 13/966,388

(22) Filed: Aug. 14, 2013

(65) Prior Publication Data

US 2015/0052081 A1 Feb. 19, 2015

(51) Int. Cl.
*G06F 9/46* (2006.01)
*G06Q 30/02* (2012.01)
*H04L 12/24* (2006.01)
*H04L 12/26* (2006.01)
*G06Q 50/18* (2012.01)

(52) U.S. Cl.
CPC ...... *G06Q 30/0284* (2013.01); *G06Q 30/0283* (2013.01); *G06Q 50/184* (2013.01); *H04L 41/5051* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 5,758,068 A * | 5/1998 | Brandt | G06F 21/10 705/59 |
| 6,889,204 B2 | 5/2005 | Sanada et al. | |
| 8,074,223 B2 | 12/2011 | Birkestrand | |
| 8,140,873 B2 | 3/2012 | Hamilton, II et al. | |
| 8,332,861 B1 | 12/2012 | Blanding | |
| 8,347,307 B2 | 1/2013 | Dawson et al. | |
| 8,365,182 B2 | 1/2013 | Groetzner et al. | |
| 2008/0104245 A1 | 5/2008 | Romero | |
| 2008/0183626 A1 | 7/2008 | Romero et al. | |
| 2008/0183712 A1 | 7/2008 | Westerinen et al. | |
| 2011/0154348 A1 | 6/2011 | Elnozahy et al. | |
| 2012/0204187 A1 | 8/2012 | Breiter et al. | |

(Continued)

FOREIGN PATENT DOCUMENTS

| | | |
|---|---|---|
| EP | 2263167 A1 | 12/2010 |
| WO | WO02/42899 A2 | 5/2002 |
| WO | WO2010/099513 A2 | 9/2010 |
| WO | WO2010/099513 A3 | 9/2010 |

OTHER PUBLICATIONS

U.S. Appl. No. 14/730,375.

(Continued)

*Primary Examiner* — Wissam Rashid
(74) *Attorney, Agent, or Firm* — Thompson Hine LLP

(57) ABSTRACT

A mechanism is provide for automating capacity upgrade on demand. Responsive to a usage of an originally allocated resource exceeding an upper predetermined threshold, access to an additional resource is temporarily allocated. A trial time counter is initiated to track a time of access to the additional resource. A user of the logical partition is alerted that the additional resource is being accessed. Responsive to the user failing to license the additional resource, a determination is made as to whether a value of the trial time counter has exceeded a predetermined trial time period value. Responsive to the value of the trial time counter exceeding the predetermined trial time period value, access to the additional resource is deactivated.

16 Claims, 5 Drawing Sheets

(56) References Cited

U.S. PATENT DOCUMENTS

| | | | |
|---|---|---|---|
| 2013/0091065 A1* | 4/2013 | Telehowski | G06Q 10/06 705/310 |
| 2013/0091282 A1 | 4/2013 | Tontiruttananon et al. | |
| 2013/0132247 A1* | 5/2013 | Shimogawa | G06Q 30/04 705/34 |

OTHER PUBLICATIONS

U.S. Patent and Trademark Office, Office Action issued in related U.S. Appl. No. 14/730,375 dated Feb. 29, 2016.

* cited by examiner

AUTOMATING CAPACITY UPGRADE ON DEMAND

BACKGROUND

The present application relates generally to an improved data processing apparatus and method and more specifically to mechanisms for automating capacity upgrade on demand.

Capacity Upgrade on Demand (CUoD) allows a user to permanently activate one or more inactive resources, such as processors, memory units, or the like, without requiring the user to restart their data processing system or interrupt their business. With CUoD, the user may activate additional processors and memory units on their data processing system by purchasing access to a permanent resource or feature. CUoD adds capacity for new workloads, which enables the user's data processing system to adapt to unexpected performance demands.

SUMMARY

In one illustrative embodiment, a method, in a data processing system, is provided for automating capacity upgrade on demand. The illustrative embodiment determines whether usage of an originally allocated resource allocated to a logical partition has exceeded an upper predetermined threshold. The illustrative embodiment temporarily allocates access to an additional resource in response to the usage of the originally allocated resource exceeding the upper predetermined threshold. The illustrative embodiment initiates a trial time counter to track a time of access to the additional resource. The illustrative embodiment alerts a user of the logical partition that the additional resource is being accessed. The illustrative embodiment determines whether a value of the trial time counter has exceeded a predetermined trial time period value in response to the user failing to license the additional resource. The illustrative embodiment deactivates access to the additional resource in response to the value of the trial time counter exceeding the predetermined trial time period value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Capacity Upgrade on Demand (CUoD) is useful for customers that obtain access to a data processing system that increases in capacity as their needs grow. The customer does not pay for all the resources in the data processing system until they are ready to use them. However, one issue with current CUoD implementations is that the customer may not always know beforehand when the additional capacity is needed. When a workload spike hits, the customer has to react by purchasing access to additional resources, which generally requires authentication, validation, or the like. This may take a long time, which may cause the additional workload to be improperly handled.

The illustrative embodiments provide for automating Capacity Upgrade on Demand (CUoD). A system performance mechanism collects data regarding resource usage of each logical partition in a logically partitioned data processing system. If resource usage for a given partition exceeds an upper predetermined threshold for a predetermined time period due to excess workload, the system performance mechanism temporarily allocates access to one or more additional resources that are not already licensed to the given partition for a trial period. A user of the partition is notified that the one or more additional resources have been temporarily allocated in order to cope with the additional workload. If the user wants the one or more additional resources to be permanently allocated, the user is directed to purchase a license for the one or more additional resources. If the user purchases a license for the one or more additional resources, then the one or more additional resources are permanently allocated to the given partition. Otherwise, at the end of the trial period the one or more additional resources are deactivated.

Figure 1:
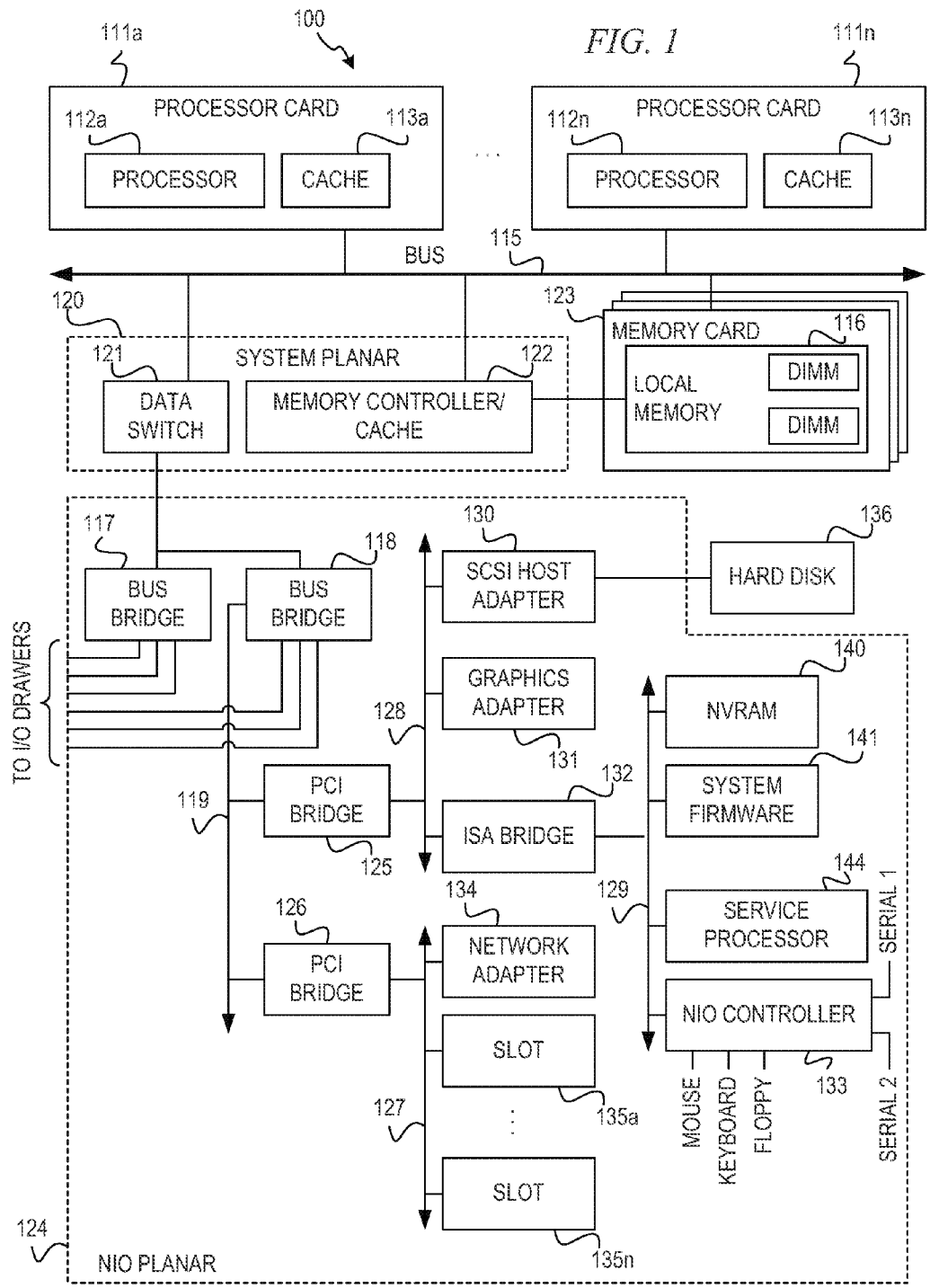
FIG. 1 is an example diagram of a distributed data processing system in which aspects of the illustrative embodiments may be implemented.
Figure 2:
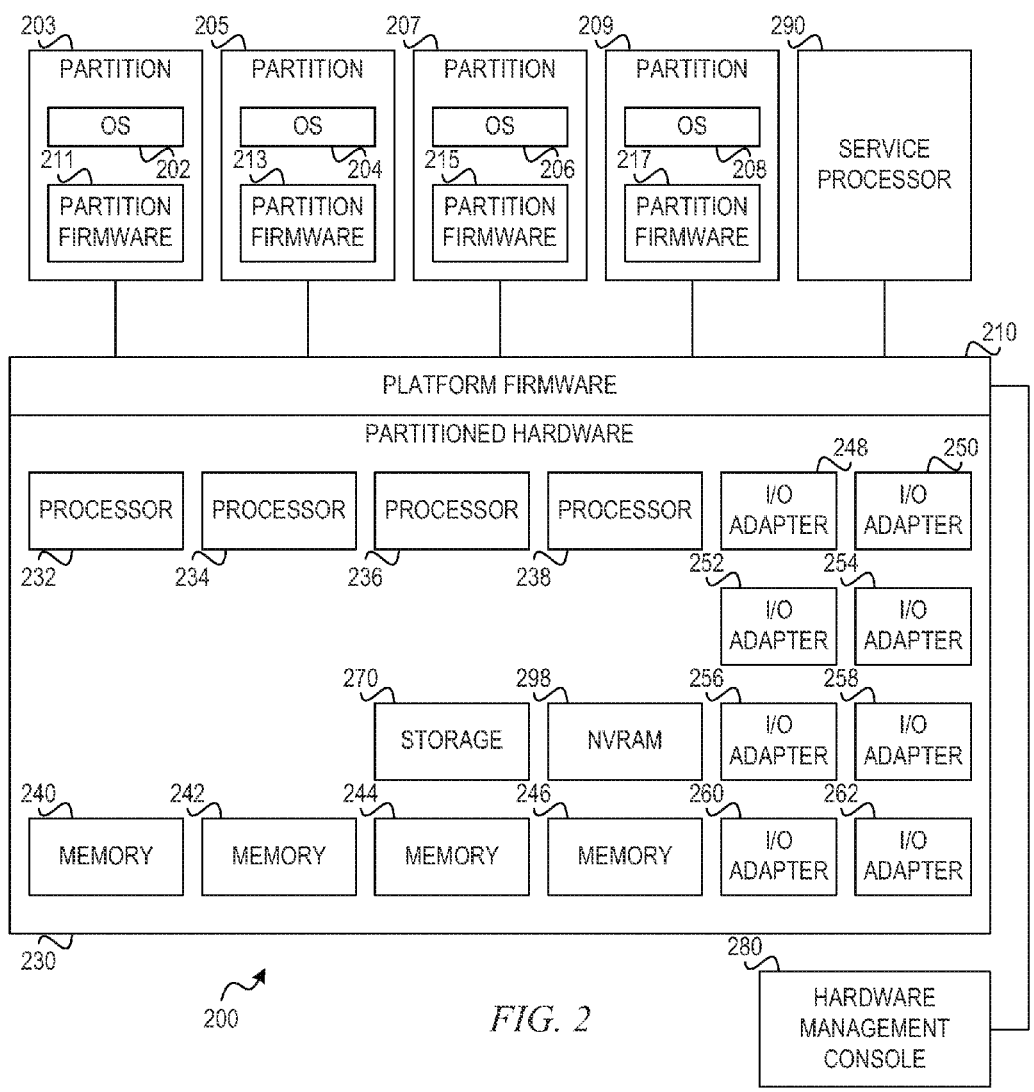
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PC bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 177.

An industry standard architecture (ISA) bus 129 connects to PCI bus 128 via ISA bridge 132. ISA bridge 132 provides interconnection capabilities through NIO controller 133 having serial connections Serial 1 and Serial 2 . A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 2 is a block diagram of an exemplary logical partitioned platform in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously run on platform 200. These operating systems may be implemented using the operating system, the IBM i™ operating system or the Linux™ operating system, for example, which are designed to interface with server firmware. Operating systems 202, 204, 206, and 208 are located in partitions 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Firmware 210 performs a number of functions and services for partitions 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 210 allows the simultaneous execution of independent operating system images 202, 204, 206, and 208 by virtualizing all hardware resources of logical partitioned platform 200. Virtualization is the pooling of information technology resources in a way that shields the physical nature and boundaries of those resources from users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™

V5R3 operating system that allows one to create and manage one operating system logical partitions by initiating a console session using service tools.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system without departing from the spirit and scope of the present invention.

Figure 3:
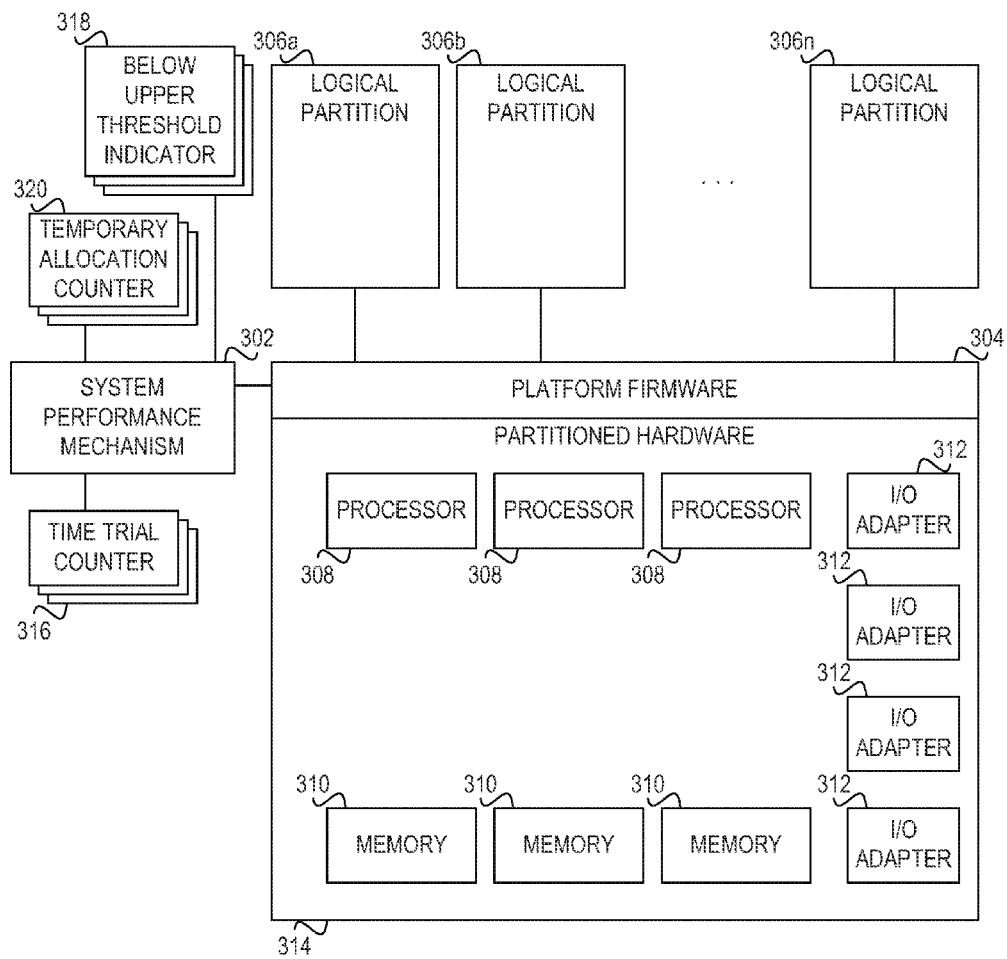
FIG. 3 depicts a functional block diagram of a system performance mechanism that automates Capacity Upgrade on Demand (CUoD) in accordance with an illustrative embodiment.

FIG. 3 depicts a functional block diagram of a system performance mechanism that automates Capacity Upgrade on Demand (CUoD) in accordance with an illustrative embodiment. Data processing system 300 comprises system performance mechanism 302 that may operate within or in conjunction with firmware 304, such as platform firmware 210 of FIG. 2. System performance mechanism 302 monitors resource usage as each logical partition in a set of logical partitions 306a-306n executes its respective workloads. That is, as firmware 304 generates each logical partition in the set of logical partitions 306a-306n, firmware 304 allocates access to all or a portion of processors 308, memory 310, I/O adapters 312, or the like, in partitioned hardware 314 through a license agreement with the user of the logical partition. Then, as each logical partition in the set of logical partitions 306a-306n uses its respectively allocated resources, system performance mechanism 302 monitors the usage of these allocated resources and collects data regarding the allocated resource usage.

Using logical partition 306a as an example, during the operations performed by logical partition 306a, system performance mechanism 302 determines whether resource usage of one or more of the resources allocated to logical partition 306a exceeds an upper predetermined threshold for a predetermined time period due to excess workload. If system performance mechanism 302 determines that logical partition 306a resource usage of one or more of its allocated resources exceeds the upper predetermined threshold during the predetermined time period, system performance mechanism 302 in conjunction with firmware 304 temporarily allocates access to one or more additional resources. System performance mechanism's 302 temporarily allocation of the one or more resources is only for a predetermined time trial period. Thus, for each of the one or more additional resources that system performance mechanism 302 temporarily allocates access to logical partition 306a, system performance mechanism 302 initiates a trial time counter of a set of trial time counters 316 to track a time logical partition 306a that is temporarily accessing the additional one or more resources.

With the temporary allocation of the one or more additional resources, system performance mechanism 302 alerts a user of logical partition 306a that the one or more additional resources is being accessed as well as notifying the user of the remaining portion of the predetermined time trial period for which the one or more additional resources are temporarily allocated. System performance mechanism 302 then presents the user with the opportunity to permanently license the one or more additional resources during the predetermined time trial period. At periodic intervals during the predetermined trial time period, system performance mechanism 302 determines whether the user has licensed the one or more additional resources. At each of these periodic intervals, if system performance mechanism 302 determines that the user has failed to license the one or more additional resources, system performance mechanism 302 determines whether a value of the associated ones of the set of trial time counters 316 has exceeded the predetermined trial time period value. If system performance mechanism 302 determines that the value of the associated ones of the set of trial time counters 316 has exceeded the predetermined trial time period value, system performance mechanism 302 deactivates access to the one or more additional resources.

If at the periodic intervals system performance mechanism 302 determines that the value of the associated ones of the set of trial time counters 316 has failed to exceed the predetermined trial time period value, then system performance mechanism 302 may determine whether resource usage of one or more of the resources originally allocated to logical partition 306a still exceeds an upper predetermined threshold. If system performance mechanism 302 determines that the resource usage currently fails to exceed the upper predetermined threshold, system performance mechanism 302 may set below upper threshold indicator 318 to a first value and then increment the value upon each subsequent determination that the resource usage fails to exceed the upper predetermined threshold until a predetermined value is reached. That is, so as not to temporarily allocate and then de-allocate resources to logical partition 306a, system performance mechanism 302 may wait for below upper threshold indicator 318 to reach the predetermined value. Once the below upper threshold indicator 318 reaches the predetermined value, system performance mechanism 302 recognizes that logical partition 306a no longer needs the one or more additional resources and system performance mechanism 302 in conjunction with firmware 304 de-allocates the one or more additional resources.

So as to provide every opportunity to the user of logical partition 306a, if the one or more additional resources are still temporarily allocated (i.e., the user has not licensed the one or more additional resources), system performance mechanism 302 may also provide additional alerts to the user during the predetermined time trial period informing the user of the one or more additional resources being accessed as well as the remaining portion of the predetermined time trial period for which the one or more additional resources are temporarily allocated.

Finally, so that the user of logical partition 306a does not continually take advantage of the temporarily allocated one or more additional resources, once system performance mechanism 302 temporarily allocates the one or more additional resources, system performance mechanism 302 initiates temporary allocation counter 320 for logical partition 306a. Temporary allocation counter 320 is a block to any additional temporary allocation of additional resources to logical partition 306a until the value of temporary allocation counter 320 reaches a value that indicates system performance mechanism 302 may again temporarily allocate additional resources to logical partition 306a.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) my be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Hash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
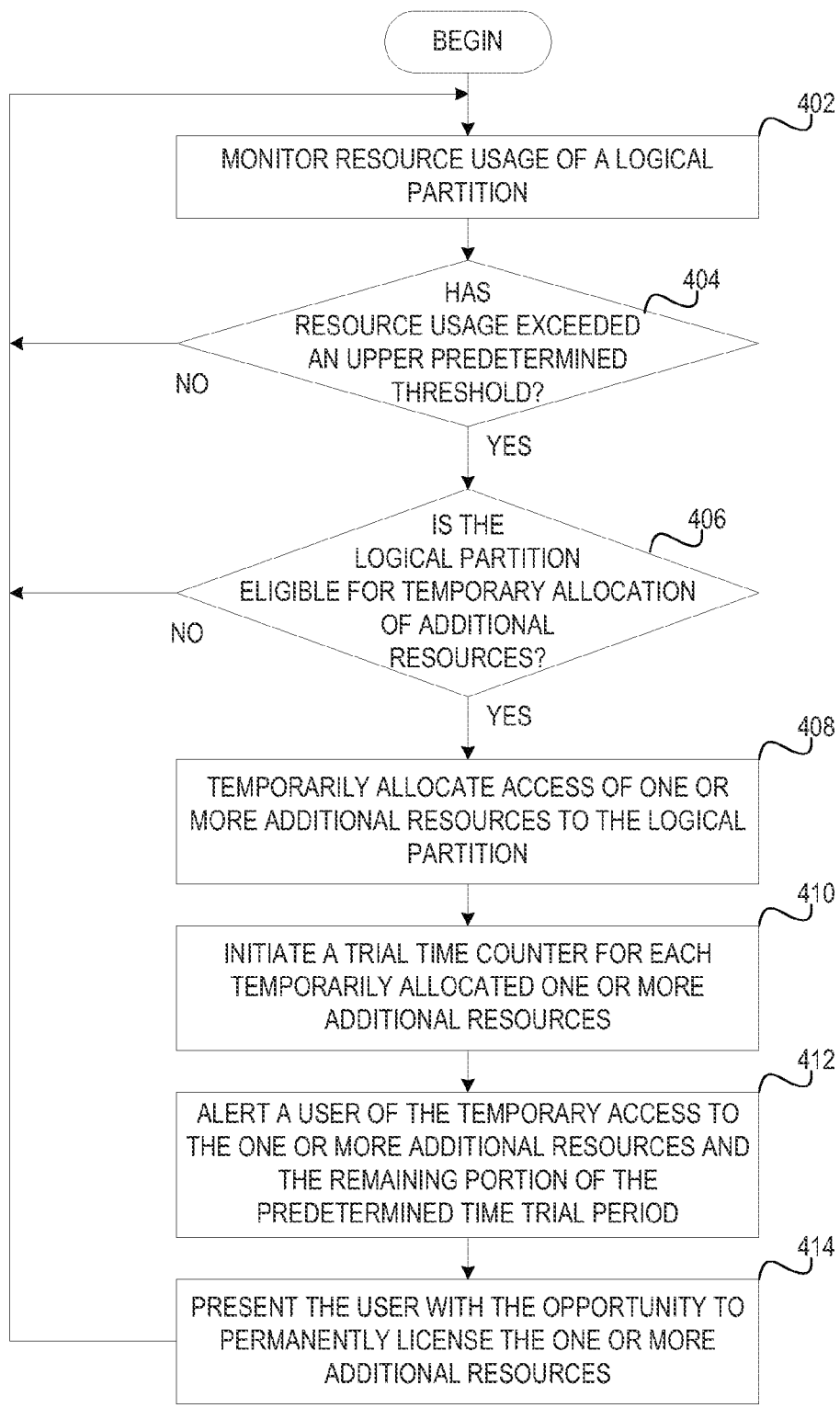
FIG. 4 depicts a flow diagram of the operation performed by a system performance mechanism in automating Capacity Upgrade on Demand (CUoD) in accordance with an illustrative embodiment.

FIG. 4 depicts a flow diagram of the operation performed by a system performance mechanism in automating Capacity Upgrade on Demand (CUoD) accordance with an illustrative embodiment. As the operation begins, the system performance mechanism monitors resource usage as each logical partition in a set of logical partitions executes its respective workloads (step 402). The system performance mechanism determines whether resource usage of one or more of the resources allocated to a logical partition exceeds an upper predetermined threshold for a predetermined time period due to excess workload (step 404). If at step 404 the system performance mechanism determines that resource usage of one or more of the resources allocated to the logical partition fails to exceed the upper predetermined threshold for the predetermined time period, then the operation returns to step 402.

If at step 404 the system performance mechanism determines that the resource usage of one or more of the resources allocated to the logical partition exceeds the upper predetermined threshold for the predetermined time period, the system performance mechanism determines whether the logical partition is eligible for temporary allocation of additional resources (step 406). If at step 406 the system performance mechanism determines that the user is not eligible for the temporary allocation of additional resources, the operation returns to step 402. If at step 406 the system performance mechanism determines that the user is eligible for the temporary allocation of additional resources, the system performance mechanism in conjunction with firmware temporarily allocates access of one or more additional resources to the logical partition step 408). The system performance mechanism temporarily allocates the one or more resources only for a predetermined time trial period. Thus, for each of the one or more additional resources that the system performance mechanism temporarily allocates access to the logical partition, the system performance mechanism initiates a trial time counter of a set of trial time counters to track a trial time that logical partition is temporarily accessing each of the one or more additional resources (step 410).

With the temporary allocation of the one or more additional resources, the system performance mechanism alerts a user of the logical partition that the one or more additional resources is being accessed as well as notifying the user of the remaining portion of the predetermined time trial period for which the one or more additional resources are temporarily allocated (step 412). The system performance mechanism also presents the user with the opportunity to permanently license the one or more additional resources during the predetermined time trial period (step 414), with the operation returning to step 402 thereafter.

Figure 5:
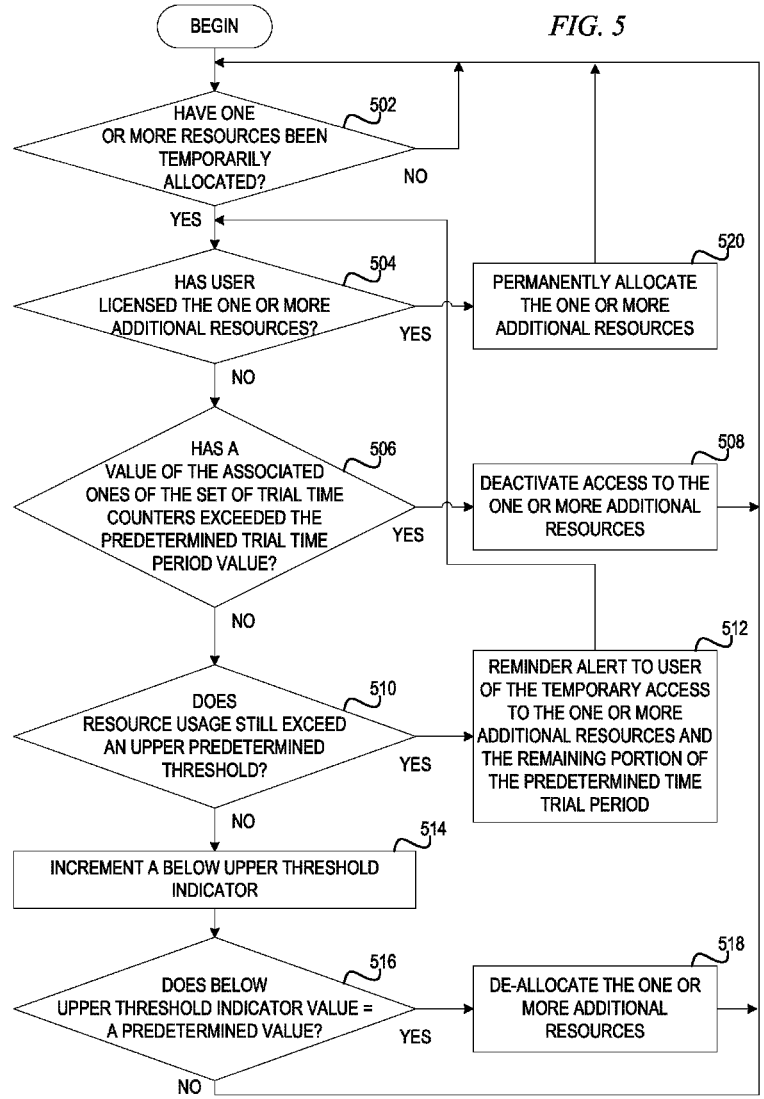
FIG. 5 depicts a flow diagram of the operation performed by a system performance mechanism in permanently allocating or de-allocating temporarily allocated resources in accordance with an illustrative embodiment.

FIG. 5 depicts a flow diagram of the operation performed by a system performance mechanism in permanently allocating or de-allocating temporarily allocated resources in accordance with an illustrative embodiments the operation begins, the system performance mechanism determines whether one or more resources have been allocated to a logical partition (step 502). If at step 502 the system performance mechanism determines that one or more resources have not been allocated to the logical partition, the operation returns to step 502. If at step 502 the system performance mechanism determines that one or more resources have been allocated to the logical partition, the system performance mechanism determines whether the user has licensed the one or more additional resources (step 504).

If at step 504 the system performance mechanism determines that the user has failed to license the one or more additional resources, the system performance mechanism determines whether a value of the associated ones of the set of trial time counters has exceeded the predetermined trial time period value (step 506). If at step 506 the system performance mechanism determines that the value of the associated ones of the set of trial time counters has exceeded the predetermined trial time period value, the system performance mechanism deactivates access to the one or more additional resources (step 508), with the operation returning to step 502 thereafter.

If at step 506 the system performance mechanism determines that the value of the associated ones of the set of trial time counters fails to have exceeded the predetermined trial time period value, the system performance mechanism determines whether resource usage of one or more of the resources originally allocated to the logical partition still exceeds an upper predetermined threshold (step 510). If at step 510 the system performance mechanism determines that the resource usage currently still exceeds the upper predetermined threshold, the system performance mechanism provides an additional alert to the user informing the user of the one or more additional resources being accessed as well as the remaining portion of the predetermined time trial period for which the one or more additional resources are temporarily allocated (step 512), then operation returns to step 504.

If at step 510 the system performance mechanism determines that the resource usage currently fails to exceed the upper predetermined threshold, the system performance mechanism increments a below upper threshold indicator (step 514). The system performance mechanism then determines whether the below upper threshold indicator value is equal to a predetermined value (step 516). If at step 516 the system performance mechanism determines that the below upper threshold value is not equal to the predetermined value, then the operation proceeds to step 502.

If at step 516 the system performance mechanism determines that the below upper threshold value is equal to the predetermined value, the system performance mechanism in conjunction with the firmware de-allocates the one or more additional resources (step 518), with the operation returning to step 502 thereafter. Finally, if at step 504 the system performance mechanism determines that the user has licensed the one or more additional resources, the system performance mechanism in conjunction with the firmware permanently allocates the one or more additional resources (step 520), with the operation returning to step 502 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in act, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for automating Capacity Upgrade on Demand (CUoD). A system performance mechanism collects data regarding resource usage of each logical partition in a logically partitioned data processing system. If resource usage for a given partition exceeds an upper predetermined threshold for a predetermined time period due to excess workload, the system performance mechanism temporarily allocates access to one or more additional resources that are not already licensed to the given partition for atrial period. A user of the partition is notified that the one or more additional resources have been temporarily allocated in order to cope with the additional workload. If the user wants the one or more additional resources to be permanently allocated, the user is directed to purchase a license for the one or more additional resources. If the user purchases a license for the one or more additional resources, then the one or more additional resources are permanently allocated to the given partition. Otherwise, at the end of the trial period the one or more additional resources are deactivated.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product, comprising:
a non-transitory computer readable storage medium having a computer readable program stored therein, wherein the computer readable program, when executed on a computing device, causes the computing device to:
determine whether usage of an originally allocated resource allocated to a logical partition has exceeded an upper predetermined threshold;
responsive to the usage of the originally allocated resource exceeding the upper predetermined threshold, allocate to the logical partition access to a first additional resource not already licensed to the logical partition for a first trial period;
alert a user of the logical partition that the first additional resource is being accessed in conjunction with the logical partition being allocated the access to the first additional resource; and
in response to the access to the first additional resource being allocated to the logical partition for the first trial period:
initiate a first counter to track a time of access to the first additional resource by the logical partition; and
responsive to the user failing to license the first additional resource for use beyond the first trial period:
determine whether a first value of the first counter is greater than a predetermined trial time period value; and
responsive to the first value of the first counter being greater than the predetermined trial time period value, deactivate access to the first additional resource.

2. The computer program product of claim 1, wherein the computer readable program causes the computing device to:
responsive to the user purchasing a license for the first additional resource, permanently allocate access to the first additional resource.

3. The computer program product of claim 1, wherein the computer readable program further causes the computing device to:
responsive to the first value of the first counter failing to exceed the predetermined trial time period value, determine whether usage of the originally allocated resource still exceeds the upper predetermined threshold; and
responsive to the use of the originally allocated resource failing to still exceed the upper predetermined threshold, deactivate access to the first additional resource.

4. The computer program product of claim 1, wherein the computer readable program further causes the computing device to:
responsive to the first value of the first counter failing to exceed the predetermined trial time period value, determine whether usage of the originally allocated resource still exceeds the upper predetermined threshold; and
responsive to the use of the originally allocated resource still exceeding the upper predetermined threshold:
continue to allocate access to the first additional resource; and
continue to determine whether the first value of the first counter exceeds the predetermined trial time period value.

5. The computer program product of claim 1, wherein the computer readable program further causes the computing device to:
in response to the access to the first additional resource being allocated to the logical partition for the first trial period:
determine whether the usage of the originally allocated resource still exceeds the upper predetermined threshold; and
responsive to a determination that the usage of the originally allocated resource fails to still exceed the upper predetermined threshold:
increment a second counter that tracks a number of times the usage of the originally allocated resource is determined to fail to still exceed the upper predetermined threshold after the access to the first additional resource is allocated;
determine whether a second value of the second counter is equal to a predetermined deactivation value;
in response to determining that the second value of the second counter is equal to the predetermined deactivation value, deactivate access to the first additional resource; and
in response to determining that the second value of the second counter fails to equal the predetermined deactivation value, continue to determine whether the use of the originally allocated resource still exceeds the upper predetermined threshold.

6. The computer program product of claim 1, wherein the computer readable program further causes the computing device to:
responsive to the first value of the first counter exceeding a predetermined value of the predetermined trial time period value, determine whether usage of the originally allocated resource exceeds the upper predetermined threshold; and
responsive to the use of the originally allocated resource exceeding the upper predetermined threshold, notify the user that the first trial period is about to expire.

7. The computer program product of claim 1, wherein the originally allocated resource is a processing resource or a memory resource.

8. The computer program product of claim 1, wherein the computer readable program further causes the computing device to:
in response to the access to the first additional resource being allocated to the logical partition for the first trial period, initiate a third counter to track a time since the access to the first additional resource was allocated to the logical partition for the first trial period;
after access to the first additional resource is deactivated, determine that the usage of the originally allocated resource allocated the logical partition again exceeds the upper predetermined threshold; and
in response to determining that the usage of the originally allocated resource allocated to logical partition again exceeds the upper predetermined threshold:
determine whether a third value of the third counter is less than a predetermined trial eligibility value,
in response to determining that the third value is less than the predetermined trial eligibility value, block the logical partition from being allocated access to a second additional resource for a second trial period, and
in response to determining that the third value is greater than or equal to the predetermined trial eligibility value, allocate the logical partition access to the second additional resource for the second trial period.

9. The computer program product of claim 1, wherein the access to the first additional resource not already licensed to logical partition is allocated to the logical partition in response to the usage of the originally allocated resource exceeding the upper predetermined threshold for a predetermined time period.

10. An apparatus comprising:
a processor; and
a memory coupled to the processor, wherein the memory comprises instructions which, when executed by the processor, cause the processor to:
determine whether usage of an originally allocated resource allocated to a logical partition has exceeded an upper predetermined threshold;
responsive to the usage of the originally allocated resource exceeding the upper predetermined threshold, allocate to the logical partition access to an additional resource not already licensed to the logical partition for a trial period;
alert a user of the logical partition that the additional resource is being accessed in conjunction with the logical partition being allocated the access to the additional resource; and
in response to the access to the additional resource being allocated to the logical partition for the trial period:
initiate a trial time counter to track a time of access to the additional resource by the logical partition; and
responsive to the user failing to license the additional resource for use beyond the trial period:
determine whether a value of the trial time counter has exceeded a predetermined trial time period value; and
responsive to the value of the trial time counter exceeding the predetermined trial time period value, deactivate access to the additional resource.

11. The apparatus of claim 10, wherein the instructions further cause the processor to:
responsive to the user purchasing a license to the additional resource, permanently allocate access to the additional resource.

12. The apparatus of claim 10, wherein the instructions further cause the processor to:
responsive to the value of the trial time counter failing to exceed the predetermined trial time period value, determine whether usage of the originally allocated resource still exceeds the upper predetermined threshold; and
responsive to the use of the originally allocated resource failing to still exceed the upper predetermined threshold, deactivate access to the additional resource.

13. The apparatus of claim 10, wherein the instructions further cause the processor to:
responsive to the value of the trial time counter failing to exceed the predetermined trial time period value, determine whether usage of the originally allocated resource still exceeds the upper predetermined threshold; and
responsive to the use of the originally allocated resource still exceeding the upper predetermined threshold:
continue to allocate the access to the additional resource to the logical partition; and
continue to determine whether the value of the trial time counter has exceeded the predetermined trial time period value.

14. The apparatus of claim 10, wherein the instructions further cause the processor to:
responsive to the usage of the originally allocated resource failing to exceed the upper predetermined threshold, continue to determine whether the use of the originally allocated resource associated with a client has exceeded the upper predetermined threshold.

15. The apparatus of 10, wherein the instructions further cause the processor to:
responsive to the value of the trial time counter exceeding a predetermined value of the predetermined trial time period value, determine whether usage of the originally allocated resource exceeds the upper predetermined threshold; and
responsive to the use of the originally allocated resource exceeding the upper predetermined threshold, notify the user that the trial period is about to expire.

16. The apparatus of claim 10, wherein the originally allocated resource is a processing resource or a memory resource.

* * * * *